United States Patent [19]

Usui

[11] Patent Number: 5,009,376
[45] Date of Patent: Apr. 23, 1991

[54] SEIZURE-FIXING DEVICE OF PIPE BY CLAMP MEMBER

[75] Inventor: Masayoshi Usui, Numazu, Japan

[73] Assignee: Usui Kokusai Sangyo Kaisha Ltd., Japan

[21] Appl. No.: 513,871

[22] Filed: Apr. 24, 1990

[30] Foreign Application Priority Data

Apr. 26, 1989 [JP] Japan .................... 1-48981[U]
Apr. 26, 1989 [JP] Japan .................... 1-48982[U]
Apr. 26, 1989 [JP] Japan .................... 1-48984[U]

[51] Int. Cl.$^5$ ............................ F16L 3/08
[52] U.S. Cl. ................................ 248/74.1; 248/55
[58] Field of Search ............... 248/74.1, 74.2, 55

[56] References Cited

U.S. PATENT DOCUMENTS

| 4,490,888 | 1/1985 | Levant | 248/74.1 X |
| 4,530,478 | 7/1985 | McClellan | 248/55 X |
| 4,763,132 | 8/1988 | Juds et al. | 248/74.1 X |
| 4,787,583 | 11/1988 | Morton | 248/55 |
| 4,795,114 | 1/1989 | Usui et al. | 248/74.1 X |
| 4,909,462 | 3/1990 | Usui | 248/74.1 |

*Primary Examiner*—Gary L. Smith
*Assistant Examiner*—Suzanne L. Dino
*Attorney, Agent, or Firm*—Anthony J. Casella; Gerald E. Hespos

[57] ABSTRACT

A seizure fixing device of a pipe by a clamp member comprising a pipe, a clamp member having a seizure wall and a mounting wall at once end, a resinous bush interposed between the pipe and the clamp member and bonded via a bonding layer to the pipe, and a means for fixing the clamp member to the bush. The clamp member, which may be formed with protrusions or an elastic film, is fixed to the bush, thus effecting the seizure-fixation without causing damage to the plating films and permeation of water into the fixing portion.

14 Claims, 2 Drawing Sheets

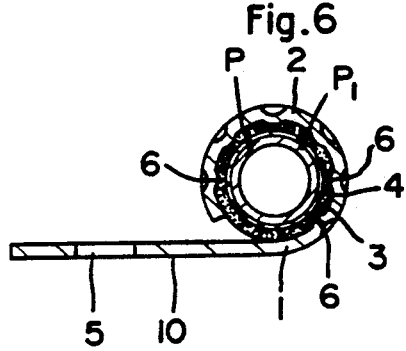
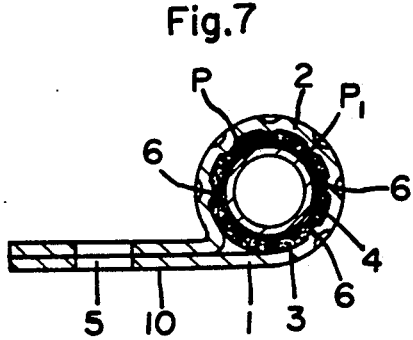
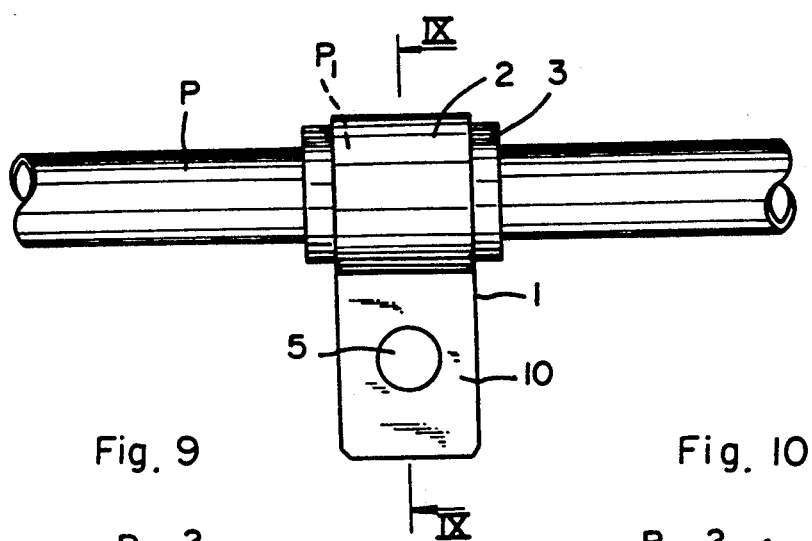
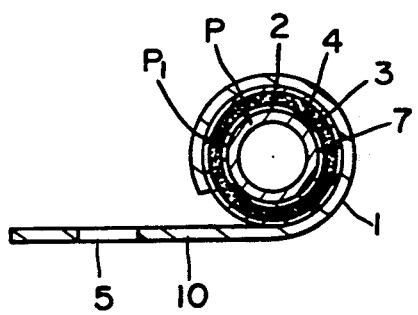
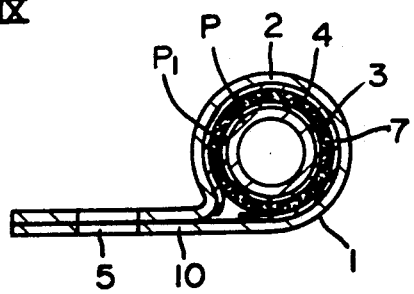
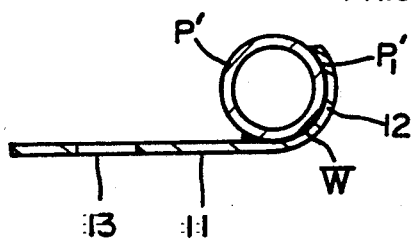
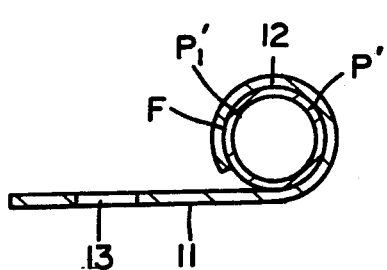

SEIZURE-FIXING DEVICE OF PIPE BY CLAMP MEMBER

BACKGROUND OF THE INVENTION

1. Field of the Invention

The present invention is directed to a seizure-fixing device of a pipe by a clamp member in a pipe having a relatively small diameter of approximately 20 m/m or less, which is arranged as a supply passageway for supplying the air and oil generally to an automobile or a variety of machinery, equipments and so on.

2. Description of the Prior Arts:

This type of conventional seizure-fixing structure is, as illustrated in section in FIGS. 11 and 12, arranged such that an engagement wall (12), which is integral with a clamp member (11) and formed as a segmental opening or in a circular shape at its one end in the longitudinal direction, is wrapped round an outer peripheral portion of a fitting wall (P1') simply assuming a circular configuration of a pipe (P'), and in this state their overlapping surfaces are heat-brazed (W) (FIG. 11), or alternatively the engagement wall (12) is slightly pressed inwards to fixedly fit (F) them to each other (FIG. 12). Note that the numeral (13) represents a mounting hole.

In the above-described techniques, however, the former technique presents a problem where rust preventive plating films previously applied on the pipe (P') and on the clamp member are damaged due to heat-brazing, and hence there is no choice but to effect plating thereon after brazing (W) has been performed, resulting in a remarkably deteriorated workability if the pipe (P') is elongate and assumes an intricate curvilinearity. The latter technique is attended with the following problem. There are caused scatters each time the operation is done because of the fixing structure simply by the fixing (F) process. Such scatters in turn lead to uncertainty of fixation. Positional deviation is also caused in the mutual fixing portions due to vibrations caused during the pipe arrangement. The plating films are defaced by friction or exfoliated. Besides, cracks and breakage of the pipe (P') are induced.

SUMMARY OF THE INVENTION

It is a primary object of the present invention, which has been devised to obviate the foregoing problems inherent in the prior arts, to provide a seizure-fixing device of a pipe by a clamp member which is capable of effecting fixation by use of the clamp member and a pipe which are coated beforehand with plating films, eliminating anxieties for frictional defacement and exfoliation of the plating films and for cracks and damages to the pipe by effectively preventing positional deviation during even vibrations under pipe arranging condition by virtue of a firm fixing structure, and further preventing permeation of rainwater and car washing water into an interior where the seizure-fixation is carried out, thereby producing no rust therein.

To this end, according to one aspect of the invention, there is provided a seizure-fixing device of a pipe by a clamp member, comprising: a pipe; a clamp member including a seizure wall wrapping round the pipe and a mounting wall leastwise at its one end in the longitudinal direction; resinous bush having a thermal, contractility, the bush being interposed between the pipe and the clamp member and bonded via a bonding layer to an outer peripheral surface of the pipe; and a means for resiliently fixing the seizure wall of the clamp member to the bush.

The fixing means is composed of a fitting wall so formed on the pipe as to assume a non-circular shape in section and a seizure wall formed in a shape similar to the sectional configuration of the fitting wall. A crosswise dimension of the seizure wall assuming the non-circular shape in section is set equal to or smaller than a width of the fitting wall. The non-circular shape in section includes at least one flat surface on the outer peripheral surface of the pipe.

Furthermore, the fixing means may be constituted by protrusions which are provided on the seizure wall and press-intruded into an outer perpheral surface of the resinous bush.

The fixing means is constructed of an elastic film interposed between the seizure wall and the resinous bush. In this case, the elastic film is made of a relatively soft resin or rubber material and formed on an inner peripheral surface of the seizure wall. p The bonding layer for fixing the resinous bush involves the use of, preferably, a hot-melt type bonding agent.

The seizure wall is formed at one end or at a substantially central portion of the clamp member shaped by press working. The mounting wall of the clamp member is bored with at least a mounting hole with respect to an opponent base body.

In accordance with a first embodiment of the present invention, the bush made of the thermally contractile resin is firmly bonded to the fitting wall of the pipe which assumes the non-circular shape with the bonding layer. In this state, the outer periphery of the resinous bush is forced to wrap round the pipe wall, thus fixing the bush thereto by resilient fitting/engaging processes.

In accordance with a second embodiment of the present invention, the thermally contractile resin bush firmly bonded to the pipe wall with the bonding layer is fixed by the resilient fitting/engaging processes effected from outside by the seizure wall of the clamp member formed with a plurality of protrusions on its inner surface.

In accordance with a third embodiment of the present invention, the outer peripheral surface of the thermally contractile resin bush firmly bonded thereto with the bonding layer resiliently comes in contact with the elastic film formed on the inner peripheral surface of the seizure wall, thus effecting the seizure-fixation thereof.

According to the present invention, the pipe and the clamp member which are previously coated with the plating films are made usable, and at the same time there is provided the resiliently fixing structure with respect to the seizure wall of the clamp member and the resinous bush. Based on this structure, the positional deviation can effectively be prevented under even an oscillatory condition, thereby eliminating anxieties for defacement and exfoliation of the plating films as well as for cracks and damages to the pipe. Besides, the fixation by use of the bonding layer eradicates generation of internal rust by hindering permeation of the rainwater or car washing water into an interior of the fixed portion.

BRIEF DESCRIPTION OF THE DRAWINGS

Other objects and advantages of the present invention will become apparent during the following discussion taken in conjunction with the accompanying drawings, in which:

FIG. 1 is an enlarged sectional view taken substantially along the line II—II of FIG. 1;

Figure 5:
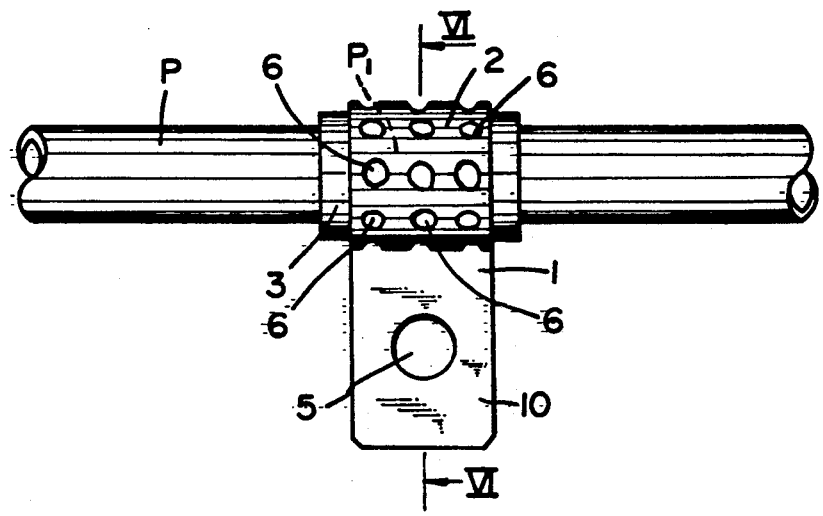
FIG. 5 is a plan view depicting a seizure-fixing structure of a pipe by a clamp member in another embodiment of the invention.

FIG, 6 is a sectional view taken substantially along the line VI—VI of FIG. 5;

FIG.7 is a view similar to FIG. 6, showing a further example of the structure;

FIG. 8 is a plan view illustrating a seizure-fixing structure of a pipe by a clamp member in still another embodiment of the invention;

FIG. 9 is a sectional view taken substantially along the line IX—IX of FIG. 8;

FIG. 10 is as view similar to FIG. 9, showing still a further example of the structure;

FIG. 11 is a sectional view depicting a prior art fixing structure; and

FIG. 12 is a sectional view showing another example of the prior art fixing structure.

DETAILED DESCRIPTION OF THE PREFERRED EMBODIMENTS

In FIGS. 1 through 10, the same components are marked with the like reference numerals.

Figure 1:
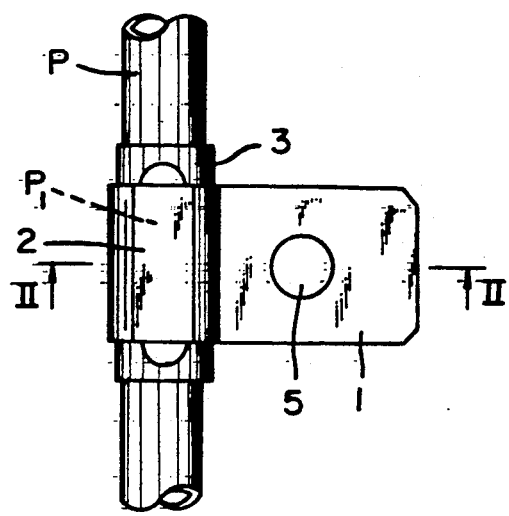
FIG. 1 is a plan view illustrating a seizure-fixing structure of a pipe by a clamp member in one embodiment of the present invention.
Figure 2:
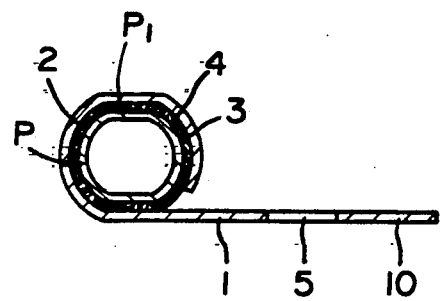
Figure 3:
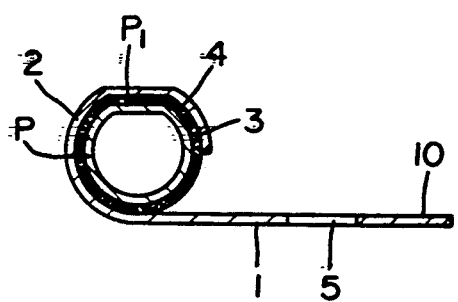
FIG. 3 is a view similar to FIG. 2, showing another example of the structure.
Figure 4:
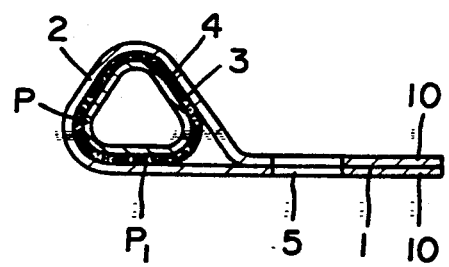
FIG. 4 is a view similar to FIG. 2, showing still another example of the structure.

Turning first to FIGS. 1 through 4, there is shown a first embodiment which will hereinafter be described. Designated at (P) is a pipe including a fitting wall (P1) formed by deforming a desired part of a peripheral surface to shape a flat surface, the wall (P1) assuming a non-circular configuration in section. Indicated at (1) is a clamp member including a seizure wall (2) assuming a sectionally non-circular shape similar to that of the fitting wall (P1), the seizure wall (2) being formed at its one end (FIG. 3) in the longitudinal direction or at a substantially central portion thereof by effecting press working on a tabular member. The clamp member (1) is also formed with a mounting wall (10) at the other end (FIG. 3) or at both ends (FIG. 4). A crosswise dimension of the seizure wall (2) is set equal to or smaller than a width of the fitting wall (P1). The numeral (3) denotes a bush made of a resin exhibiting a thermal contractility, the bush being bonded to an outer peripheral surface of the fitting wall (P1) shaped in a desired position of the pipe (P) with a hot-melt type bonding layer (4) formed on an inner peripheral surface thereof without interfering with a plating process in combination with a heating process at a relatively low temperature. The seizure wall (2) is wrapped round the outer peripheral portion of the fitting wall (P1), in which state a resilient fitting-/engaging process is effected thereon. Note that the numeral (5) represents a mounting hole bored in the clamp member (1) with respect to an opponent base body.

Referring next to FIGS. 5 to 7, there is shown a second embodiment of the invention. The seizure wall (2) is formed with a plurality of protrusions (6) each swelling from the inner peripheral wall thereof. The thus arranged seizure wall (2) is resiliently fitted to and engaged with an outer peripheral surface of the resinous bush (3) bonded via the bonding layer (4) to the fitting wall (P1) of the pipe (P), in which state the protrusions (6) are press-intruded into the resinous bush (3).

It is to be noted that the seizure wall (2) having the plurality of protrusions (6) may, as illustrated in FIG. 6, be formed at one end of the clamp member (1) or, as depicted in FIG. 7, at a substantially central portion thereof.

A description will be given of a third embodiment with reference to FIGS. 8 to 10. An elastic film (7) composed of PVC sol or a film composed of soft PVC, soft urethane and the like is previously coated on or bonded to an inner peripheral surface of the seizure wall (2) of the clamp member (1). The seizure wall (2) is resiliently engaged with the outer peripheral surface of the resinous bush (3) bonded, as in the embodiments discussed above, via the bonding layer (4) to the fitting wall (P1) of the pipe (P), thus seizing the pipe (P).

As explained earlier, according to the present invention, the seizure wall (2) of the clamp member (2) which assumes the sectionally non-circular shape resembling that of the fitting wall (P1) formed in a desired position of the pipe (P) is resiliently fitted to and engaged with the fitting wall (P1) with the thermally contractile resin bush (3) being bonded thereto through the bonding layer (4) and interposed therebetween, thus attaining the seizure-fixation. The seizure wall (2) of the clamp member (1) which includes the plurality of protrusions (6) each swelling from the inner peripheral surface thereof is fitted to and engaged with the fitting wall (P1) of the pipe (P) with the thermally contractile resin bush (3) being bonded thereto through the bonding layer (4) and interposed therebetween in such a way that the protrusions (6) are press-intruded thereinto. The seizure wall (2), externally coated with the elastic film (7), of the clamp member (1) is resiliently engaged with the thermally contractile resin bush (3) bonded via the bonding layer (4) to the fitting wall (P1) of the pipe (P) while providing a sufficient frictional force between the two peripheral surfaces thereof, thus seizing the pipe (P). With these arrangements, it is possible to eliminate the anxieties for the defacement and exfoliation of the plating films and for the cracks and breakage of the pipe (P) by effectively preventing the mutual positional deviation at the seizure-fixing portion under even the vibrating condition. Moreover, the generation of rust in the interior of seizure-fixing portion can be prevented by blockading the permeation of the rainwater or car wash water. In addition, the pipe (P) and the clamp member which are coated with the plating films beforehand are made usable, and hence the seizure-fixing device of the pipe by use of the quite useful tabular clamp member can be obtained.

Although the illustrative embodiments of the present invention have been described in detail with reference to the accompanying drawings, it is to be understood that the present invention is not limited to those precise embodiments. A variety of modifications or changes may be effected therein by one skilled in the art without departing from the scope or spirit of the invention.

I claim:

1. A seizure-fixing device of a pipe by a clamp member, comprising:
    a pipe;
    an elongated clamp member including a seizure wall wrapping around the pipe and a mounting wall leastwise at one longitudinal end of the clamp member;

a resinous bush having a thermal contractility, the bush being interposed between the pipe and the clamp member and bonded via a bonding layer to an outer peripheral surface of the pipe; and a fixing means for resiliently fixing the seizure wall of the clamp member to the bush, the fixing means comprising a fitting wall so formed on the pipe as to assume a non-circular shape in section, the non-circular shape including at least one flat outer peripheral surface on the pipe, and a seizure wall formed in a shape similar to the sectional shape of the fitting wall.

2. The device as set forth in claim 1, wherein a crosswise dimension of the seizure wall assuming the non-circular shape in section is at most equal to a width of the fitting wall.

3. The device as set forth in claim 1, wherein the fixing means may be constituted by protrusions which are provided on the seizure wall and press-intruded into an outer peripheral surface of the resinous bush.

4. The device as set forth in claim 1, wherein the fixing means is constructed of an elastic film interposed between the seizure wall and the resinous bush.

5. The device as set forth in claim 4, wherein the elastic film is made of a soft resin or rubber material.

6. The device as set forth in claim 4, wherein the elastic film is formed on an inner peripheral surface of the seizure wall.

7. The device as set forth in claim 1, wherein the bonding layer involves the use of a hot-melt type bonding agent.

8. The device as set forth in claim 1, wherein the seizure wall is formed at one end of the clamp member.

9. The device as set forth in claim 1, wherein the seizure wall is formed at a substantially central portion of the clamp member.

10. The device as set forth in claim 1, wherein the clamp member is shaped by press working.

11. The device as set forth in claim 1, wherein the clamp member is bored with at least a mounting hole with respect to an opponent base body.

12. A seizure-fixing device of a pipe by a clamp member, comprising:

a pipe;

an elongated clamp member including a seizure wall wrapping around the pipe and a mounting wall leastwise at one longitudinal end of the clamp member;

a resinous bush having a thermal contractility, the bush being interposed between the pipe and the clamp member and bonded via a bonding layer to an outer peripheral surface of the pipe; and a fixing means for resiliently fixing the seizure wall of the clamp member to the bush, said fixing means comprising an elastic film interposed between the seizure wall and the resinous bush.

13. The device as set forth in claim 12, wherein the elastic film is made of a soft resin or rubber material.

14. The device as set forth in claim 12, wherein the elastic film is formed on an inner peripheral surface of the seizure wall.

* * * * *